US010293686B2

(12) United States Patent
Osborn et al.

(10) Patent No.: US 10,293,686 B2
(45) Date of Patent: May 21, 2019

(54) VEHICLE AND METHOD OF CONTROLLING A VEHICLE

(76) Inventors: Russell Osborn, Warwick (GB); Ian Beverley, Warwick (GB)

( * ) Notice: Subject to any disclaimer, the term of this patent is extended or adjusted under 35 U.S.C. 154(b) by 1415 days.

(21) Appl. No.: 14/114,408

(22) PCT Filed: Apr. 30, 2012

(86) PCT No.: PCT/EP2012/057938
§ 371 (c)(1),
(2), (4) Date: Jan. 20, 2014

(87) PCT Pub. No.: WO2012/146786
PCT Pub. Date: Nov. 1, 2012

(65) Prior Publication Data
US 2014/0190758 A1 Jul. 10, 2014

(30) Foreign Application Priority Data
Apr. 28, 2011 (GB) .................... 1107139.6

(51) Int. Cl.
*F16H 48/19* (2012.01)
*B60K 17/02* (2006.01)
(Continued)

(52) U.S. Cl.
CPC ............ *B60K 17/02* (2013.01); *B60K 17/165* (2013.01); *B60K 17/3462* (2013.01);
(Continued)

(58) Field of Classification Search
CPC ....... F16H 48/19; F16H 48/22; B60K 17/165; B60K 17/35; B60K 17/3515; B60K 23/0808; B60K 2023/0858
See application file for complete search history.

(56) References Cited

U.S. PATENT DOCUMENTS 5,141,072 A  8/1992  Shibahata
8,177,672 B2  5/2012  Kato et al.
(Continued)

FOREIGN PATENT DOCUMENTS

DE  102008037885  3/2010
DE  102010039444  2/2012
(Continued)

OTHER PUBLICATIONS

International Search Report for PCT/EP2012/057938 dated Aug. 30, 2012, 4 pages.
(Continued)

*Primary Examiner* — Erin D Bishop
(74) *Attorney, Agent, or Firm* — Reising Ethington P.C.

(57) ABSTRACT

A vehicle comprising a prime mover, first and second groups of wheels, and a driveline configured to connect the prime mover to the wheels. The driveline includes an auxiliary driveline comprising a driveshaft and drive means between the driveshaft and the second group of wheels, the drive means being operable to connect the second group of wheels to the driveshaft when the driveline transitions between first and second modes. The drive means has an input portion, an output and first and second releasable torque transmitting means coupled in series therebetween. The first releasable torque transmitting means is operable to allow slip between the input and output to modulate an amount of torque transmitted therebetween, The second releasable torque transmitting means is operable between a first condition in which an input portion is isolated from an output portion and a second condition in which the input and output portions are directly coupled.

14 Claims, 6 Drawing Sheets

(51) Int. Cl.
*B60K 17/346* (2006.01)
*B60K 17/35* (2006.01)
*B60K 23/08* (2006.01)
*B60K 17/16* (2006.01)
*F16D 21/08* (2006.01)
*F16H 48/22* (2006.01)
*F16H 48/32* (2012.01)

(52) U.S. Cl.
CPC .......... *B60K 17/35* (2013.01); *B60K 17/3515* (2013.01); *B60K 23/0808* (2013.01); *F16H 48/19* (2013.01); *B60K 2023/0858* (2013.01); *F16D 21/08* (2013.01); *F16H 48/22* (2013.01); *F16H 48/32* (2013.01)

(56) References Cited

U.S. PATENT DOCUMENTS

| | | |
|---|---|---|
| 2005/0103551 A1 | 5/2005 | Matsuno |
| 2006/0046888 A1 | 3/2006 | Puiu |
| 2009/0277711 A1 | 11/2009 | Hoffmann et al. |
| 2010/0094519 A1 | 4/2010 | Quehenberger et al. |
| 2011/0082004 A1 | 4/2011 | Kato et al. |
| 2011/0179906 A1 | 7/2011 | Juenemann et al. |
| 2011/0275470 A1* | 11/2011 | Ekonen ............... B60K 17/35 475/198 |

FOREIGN PATENT DOCUMENTS

| | | |
|---|---|---|
| EP | 1533166 | 5/2005 |
| GB | 2407804 | 5/2005 |
| JP | 01233123 A | 9/1989 |
| JP | H0217249 A | 1/1990 |
| JP | 2004009954 A | 1/2004 |
| JP | 2005145334 A | 6/2005 |
| JP | 2009292307 A | 12/2009 |
| JP | 2011052819 A | 3/2011 |
| JP | 2011079421 A | 4/2011 |
| JP | 2012188000 A | 10/2012 |
| WO | 2010017882 A1 | 2/2010 |
| WO | WO2010017882 A1 | 2/2010 |
| WO | 2010085519 A1 | 7/2010 |

OTHER PUBLICATIONS

Japanese Office Action in Japanese with English summary for JP application No. 2016-123741, dated Mar. 14, 2017, 9 pages.
International Search Report for application No. GB1107139.6 dated Aug. 25, 2011, 6 pages.
International Search Report application No. GB1107139.6 dated Sep. 17, 2013, 3 pages.
English summary of Japanese Office action corresponding to Application No. JP2014-506910 dated May 29, 2015, 6 pages.
Chinese Office Action, in Chinese with English summary, corresponding to CN application No. 201280032693.1, dated Jun. 8, 2016, 16 pages.
European Examination Report for EP application No. 12717750.9, dated Sep. 12, 2017, 11 pages.
European Search Report corresponding to Application No. 12 717 750.9, dated Dec. 4, 2018, 8 pages.
Translation of Japanese Patent Office Notice of Reasons for Revocation, dated Aug. 28, 2018, 10 pages.

* cited by examiner

VEHICLE AND METHOD OF CONTROLLING A VEHICLE

FIELD OF THE INVENTION

The present invention relates to a motor vehicle and to a method of controlling a motor vehicle. In particular but not exclusively the invention relates to motor vehicles such as all-terrain vehicles (ATVs) having a driveline that is operable to change the number of wheels that provide torque to drive the vehicle. Aspects of the invention relate to an apparatus, to a method and to a vehicle.

BACKGROUND

It is known to provide a motor vehicle having a four wheel drive mode of operation in which motive power is supplied to each of two pairs of wheels of the vehicle. Motive power is supplied to the wheels by means of a driveline.

Some known vehicles are arranged such that motive power is permanently supplied to both pairs of wheels. Some other vehicles are arranged such that motive power is selectively supplied to either only one pair of wheels (in a two wheel drive mode of operation) or to both pairs of wheels (in a four wheel drive mode of operation). Some such systems allow the portion of the driveline transmitting power to the second pair of wheels to come to rest when in the two wheel drive mode thereby reducing parasitic losses.

GB2407804 discloses a dynamic driveline reconnect arrangement in which reconnection of two of the wheels to the driveline following disconnection of the wheels from the driveline may be undertaken when the vehicle is moving. Such a system may be referred to as a dynamic driveline reconnect system.

The system disclosed in GB2407804 employs clutch arrangements to enable dynamic driveline reconnection.

It is an aim of embodiments of the present invention to provide an improved dynamic driveline system.

STATEMENT OF THE INVENTION

Embodiments of the present invention may be understood by reference to the appended claims.

In one aspect of the invention for which protection is sought there is provided a vehicle comprising:
  prime mover means;
  at least first and second groups of one or more wheels; and
  a driveline to connect the prime mover means to the first and second groups of one or more wheels such that the first group of one or more wheels may be driven by the prime mover means when the driveline is in a first mode of operation and the second group of one or more wheels may additionally be driven by the prime mover means when the driveline is in a second mode of operation,
  the driveline including an auxiliary portion portion for connecting the second group of one or more wheels comprising an auxiliary driveshaft and drive means between the auxiliary driveshaft and the second group of one or more wheels, the drive means having:
  an input portion;
  a ring gear;
  an output portion; and
  first and second releasable torque transmitting means coupled in series between the ring gear and the output portion,
  the first releasable torque transmitting means having an input portion and an output portion, the first releasable torque transmitting means being operable to allow slip between the respective portions thereby to modulate an amount of torque transmitted from the input to the output portion,
  the second releasable torque transmitting means also having an input portion and an output portion, the second releasable torque transmitting means being operable between a first condition in which the input portion is substantially isolated from the output portion and a second condition in which the input and output portions are directly coupled such that torque applied to the input portion is transmitted substantially directly to the output portion.

Embodiments of the invention have the feature that the second releasable torque transmitting means may be employed to isolate the auxiliary driveshaft from the second group of one or more wheels. This has the feature that parasitic losses associated with differential rates of rotation of the input and output portions of the first releasable torque transmitting means when the driveline is in the first mode of operation may be reduced or substantially eliminated.

In some arrangements discussed below, the auxiliary driveshaft may be isolated from the prime mover means, for example by means of a power transfer unit (PTU), thereby allowing the auxiliary driveshaft to be brought to rest when only the first group of one or more wheels are being driven. Thus the input and output portions of the first releasable torque transmitting means may also be brought to rest if it is located upstream of the second releasable torque transmitting means thereby further reducing parasitic losses.

In embodiments having a PTU and in which the auxiliary driveshaft is coupled to the drive means by means of a bevel gear and a ring gear, the bevel gear and ring gear may both be brought to rest when the second group of one or more wheels are disconnected from the auxiliary driveshaft and the auxiliary driveshaft is disconnected from the prime mover means by the PTU. This allows a further reduction in losses during operation in the first mode.

This is at least in part because in some arrangements a relatively large amount of pre-loading may be present between the ring gear and bevel gear.

It is to be understood that reference to the first and second releasable torque transmitting means being coupled between the ring gear and output portions is reference to a sequence in which the components are coupled and is not to be understood as limiting in respect of physical positions of the components.

This feature in particular has the advantage that the first and second releasable torque transmitting means may be packaged in a more compact arrangement; co-location of the first and second releasable torque transmitting means may also enable a common actuator to be employed in some arrangements as described below.

Advantageously the first releasable torque transmitting means may comprise clutch means.

Further advantageously the clutch means may comprise friction clutch means.

The clutch means may comprise a wet clutch device.

Advantageously the second releasable torque transmitting means may comprise clutch means.

Further advantageously the clutch means of the second releasable torque transmitting means may comprise a dry clutch device.

This has the advantage that hydraulic fluid losses associated with wet clutch devices may be reduced or substantially eliminated. Such losses may be incurred when the wet clutch device is closed as well as when the wet clutch device is open due to churning of liquid in the device whether the device is open or closed.

The clutch means of the second releasable torque transmitting means may comprise a dog clutch device.

The use of a dog clutch device has the advantage that such clutches may be constructed with reduced complexity compared to clutches allowing slip between input and output portions thereof. An associated reduction in cost relative to certain other clutches including multi-plate wet clutches (MPCs) and the like may also be enjoyed.

Alternatively the clutch means of the second releasable torque transmitting means may comprise a roller clutch device.

Advantageously the second group of one or more wheels may comprise a plurality of wheels.

The output portion of the drive means may be arranged to provide torque to each one of a pair of side shafts of the vehicle, the side shafts being arranged to provide torque to respective different wheels of the second group of wheels.

Optionally a differential is provided thereby to allow the side shafts to rotate at different respective rates.

The differential may be comprised by the drive means.

The first releasable torque transmitting means may comprise first and second clutch means each operable to provide torque to a respective different one of said pair of side shafts.

This feature has the advantage that differential rates of rotation of each of the pair of side shafts may be accommodated by slip of one or both of the first and second clutch means. Thus in some embodiments it is not necessary to provide a differential or other means for accommodating differential rotation rates.

The first and second clutch means of the first releasable torque transmitting means may comprise first and second friction clutch means respectively.

The second releasable torque transmitting means may comprise first and second clutch means each operable to provide torque to a respective different one of said pair of side shafts.

Advantageously the first and second clutch means of the second releasable torque transmitting means may comprise first and second dog clutch means respectively.

Thus it is to be understood that in some embodiments the first clutch means of the first releasable torque transmitting means is provided in series with the first clutch means of the second releasable torque transmitting means thereby to provide drive torque to one of the pair of side shafts and the second clutch means of the first releasable torque transmitting means is provided in series with the second clutch means of the second releasable torque transmitting means thereby to provide drive torque to the other of the pair of side shafts.

Embodiments of the invention have the advantage that when the second releasable torque transmitting means is open the first releasable torque transmitting means may be arranged to be substantially isolated from the second group of one or more wheels such that substantially no parasitic losses are experienced, for example due to hydraulic fluid-induced drag on one or more components of the first releasable torque transmitting means. Thus the second releasable torque transmitting means may comprise at least one dog clutch operable in an open condition to disconnect the first releasable torque transmitting means from the second group of wheels such that substantially no hydraulic fluid losses are experienced when the vehicle is driven.

Advantageously the drive means may further comprise a ring gear arranged to be driven by the auxiliary driveshaft, the drive means being operable to bring the ring gear to rest when the driveline is in the first mode of operation.

This feature has the advantage that losses associated with rotation of the ring gear may be substantially eliminated when the driveline is in the first mode of operation.

Further advantageously the vehicle may comprise a power transfer unit operable releasably to connect the prime mover means to the auxiliary drive shaft, the driveline being operable when in the first mode to allow the auxiliary drive shaft to come to rest when the prime mover means is driving the first group of wheels.

The prime mover means may comprise first and second prime movers.

Optionally the first prime mover may be arranged to drive the first group of one or more wheels and the second prime mover is arranged to drive the second group of one or more wheels, the PTU being operable to connect the second group of one or more wheels to the second prime mover The first prime mover may be further operable to drive the second group of one or more wheels.

The second prime mover may be further operable to drive the first group of one or more wheels.

Advantageously the first releasable torque transmitting means may be operable between a first condition in which the input portion is isolated from the output portion and a second condition in which the input and output portions are directly coupled such that torque applied to the input portion is transmitted substantially directly to the output portion.

The first and second releasable torque transmitting means may be operable between the first and second conditions by means of separate respective actuators.

Alternatively or in addition the first and second releasable torque transmitting means may be arranged to be actuated by means of a common actuator.

According to another aspect of the invention for which protection is sought there is provided an apparatus for transmitting drive to a plurality of wheels of a vehicle including a prime mover, at least first and second groups of one or more wheels and a driveline to connect the prime mover to the first and second groups of one or more wheels such that the first group of one or more wheels is driven by the prime mover means when the driveline is in a first mode of operation and the second group of one or more wheels is additionally driven by the prime mover means when the driveline is in a second mode of operation, the driveline comprising an auxiliary driveshaft, wherein the apparatus is operable to connect the second group of one or more wheels to the auxiliary driveshaft when the driveline transitions between the first mode and the second mode, and wherein the apparatus comprises an input portion, an output portion and first and second releasable torque transmitting means coupled in series therebetween, the first releasable torque transmitting means having an input portion and an output portion, the first releasable torque transmitting means being operable to allow slip between the respective portions thereby to modulate an amount of torque transmitted from the input to the output portion, the second releasable torque transmitting means also having an input portion and an output portion, the second releasable torque transmitting means being operable between a first condition in which the input portion is isolated from the output portion and a second condition in which the input and output portions are directly coupled such that torque applied to the input portion is transmitted substantially directly to the output portion.

According to a further aspect of the invention for which protection is sought there is provided a method of coupling a second group of one or more wheels of a motor vehicle to prime mover means by means of a driveline having an auxiliary driveshaft comprising the steps of: coupling the auxiliary driveshaft to the second group of one or more wheels by means of a ring gear and first and second releasable torque transmitting means, the first and second releasable torque transmitting means being coupled in series; the method comprising driving the first and second releasable torque transmitting means by means of the ring gear; and allowing slip between input and output portions of the first releasable torque transmitting means thereby to modulate an amount of torque transmitted to the second group of one or more wheels with the second releasable torque transmitting means arranged such that torque applied to the input portion thereof is transmitted substantially directly to the output portion thereof; and decoupling the first releasable torque transmitting means from the second group of one or more wheels by means of the second releasable torque transmitting means such that the input and output portions of the second releasable torque transmitting means are substantially isolated from one another.

Advantageously the second releasable torque transmitting means may comprise an interference-type clutch, optionally a dog clutch.

According to a further aspect of the invention for which protection is sought there is provided a vehicle comprising: prime mover means; at least first and second groups of one or more wheels; and a driveline to connect the prime mover means to the first and second groups of one or more wheels such that the first group of one or more wheels is driven by the prime mover means when the driveline is in a first mode of operation and the second group of one or more wheels is additionally driven by the prime mover means when the driveline is in a second mode of operation, the driveline including an auxiliary driveline comprising an auxiliary driveshaft and drive means between the auxiliary driveshaft and the second group of one or more wheels, the drive means being operable to connect the second group of one or more wheels to the auxiliary driveshaft when the driveline transitions between the first mode and the second mode, the drive means having an input portion, an output portion and first and second releasable torque transmitting means coupled in series therebetween, the first releasable torque transmitting means having an input portion and an output portion, the first releasable torque transmitting means being operable to allow slip between the respective portions thereby to modulate an amount of torque transmitted from the input to the output portion, the second releasable torque transmitting means also having an input portion and an output portion, the second releasable torque transmitting means being operable between a first condition in which the input portion is isolated from the output portion and a second condition in which the input and output portions are directly coupled such that torque applied to the input portion is transmitted substantially directly to the output portion.

Within the scope of this application it is envisaged that the various aspects, embodiments, examples and alternatives, and particularly the individual features thereof, set out in the preceding paragraphs, in the claims and/or in the following description and drawings may be taken independently or in any combination thereof. For example, features described with reference to one embodiment are applicable to all embodiments, except where such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
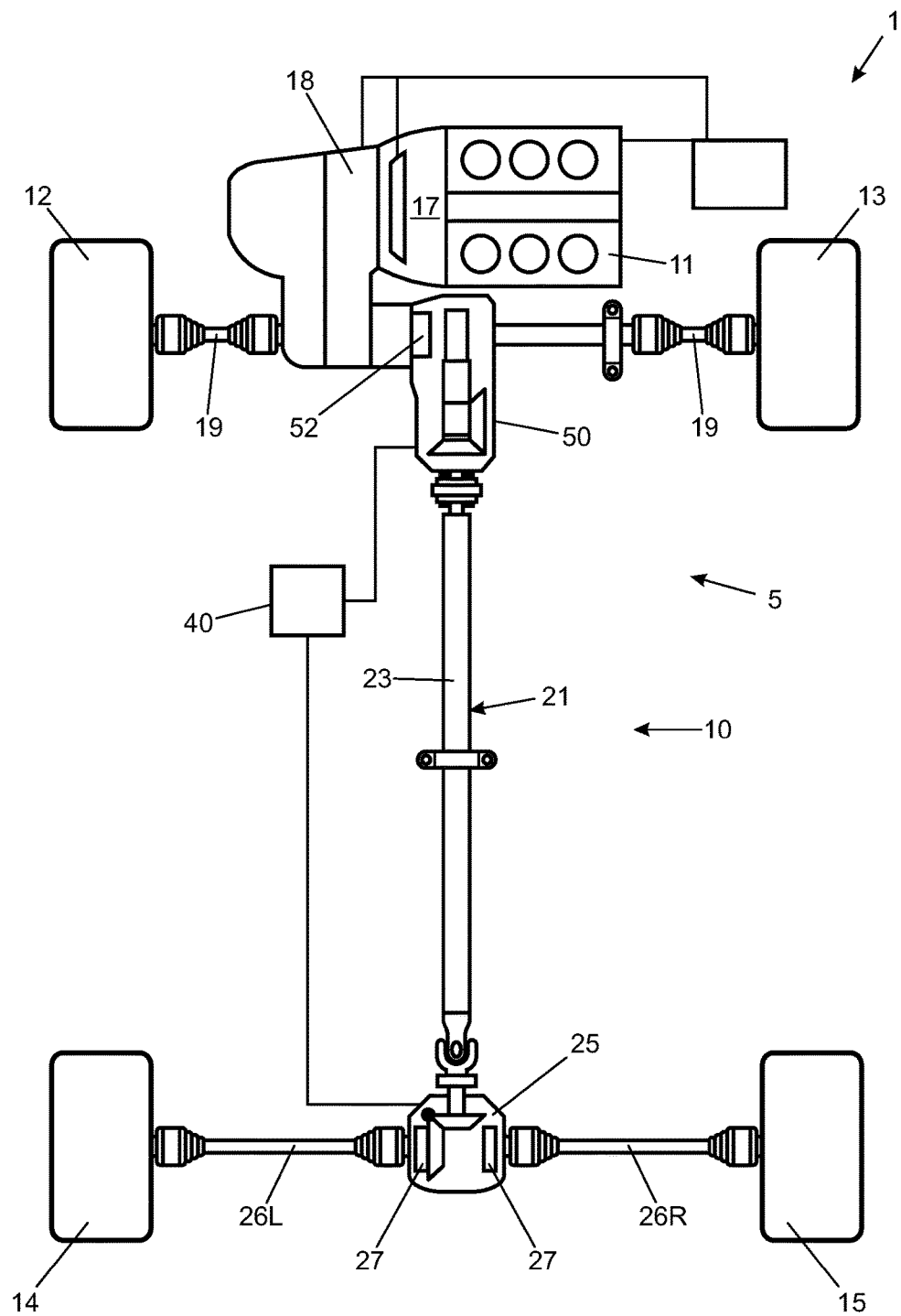
FIG. 1 is a schematic illustration of a vehicle having a known rear drive unit (RDU) having a differential and first and second differential clutches.

FIG. 1 shows a driveline 5 of a known motor vehicle 1. The driveline 5 is connected to an internal combustion engine 11 by means of a gear box 18 and has a pair of front wheels 12, 13, an auxiliary driveline 10 and a pair of rear wheels 14, 15.

The driveline 5 is arranged selectively to transmit power supplied to it by the gearbox 18 from the internal combustion engine 11 to the front wheels 12, 13 only (in a first mode of operation also referred to as a two wheel drive mode of operation) or to the front wheels 12, 13 and the rear wheels 14, 15 simultaneously (in a second mode of operation also referred to as a four wheel drive mode of operation).

Power is transmitted from the internal combustion engine 11 to the front wheels 12, 13 by means of a clutch 17, a gearbox 18 and a pair of front drive shafts 19.

Power is transmitted to the rear wheels 14, 15 by means of an auxiliary portion 10 of driveline 5 which may also be referred to as an auxiliary driveline 10. The auxiliary driveline 10 has a power transfer unit (PTU) 50 having releasable torque transmitting means in the form of a power transfer clutch (PTC) 52 operable to connect a main drive shaft 23 of the auxiliary driveline 10 to the gearbox 18. The PTC 52 is in the form of a multi-plate wet clutch (MPC) and is provided in a forward region of the vehicle 1 at or near the front drive shafts 19. The main drive shaft 23 of the auxiliary driveline 10 may also be referred to as an auxiliary drive shaft 23.

The auxiliary drive shaft 23 is coupled in turn to a rear drive unit (RDU) 25 operable to couple the main drive shaft 23 to left and right rear drive shafts 26L, 26R respectively. The RDU 25 also has releasable torque transmitting means in the form of a pair of clutches 27. The RDU 25 is thereby operable to connect the main drive shaft 23 to the rear drive shafts 26L, 26R when the four wheel drive mode of operation is required. It is to be understood that differential rates of rotation of the respective rear drive shafts 26L, 26R may be accommodated by slip of the clutches 27.

The driveline 5 has a controller 40 arranged to control operation of the PTU 50 and clutches 27. When a four wheel drive mode of operation is required the controller 40 is arranged to close the PTC 52 and to close clutches 27 of the RDU 25.

Figure 2:
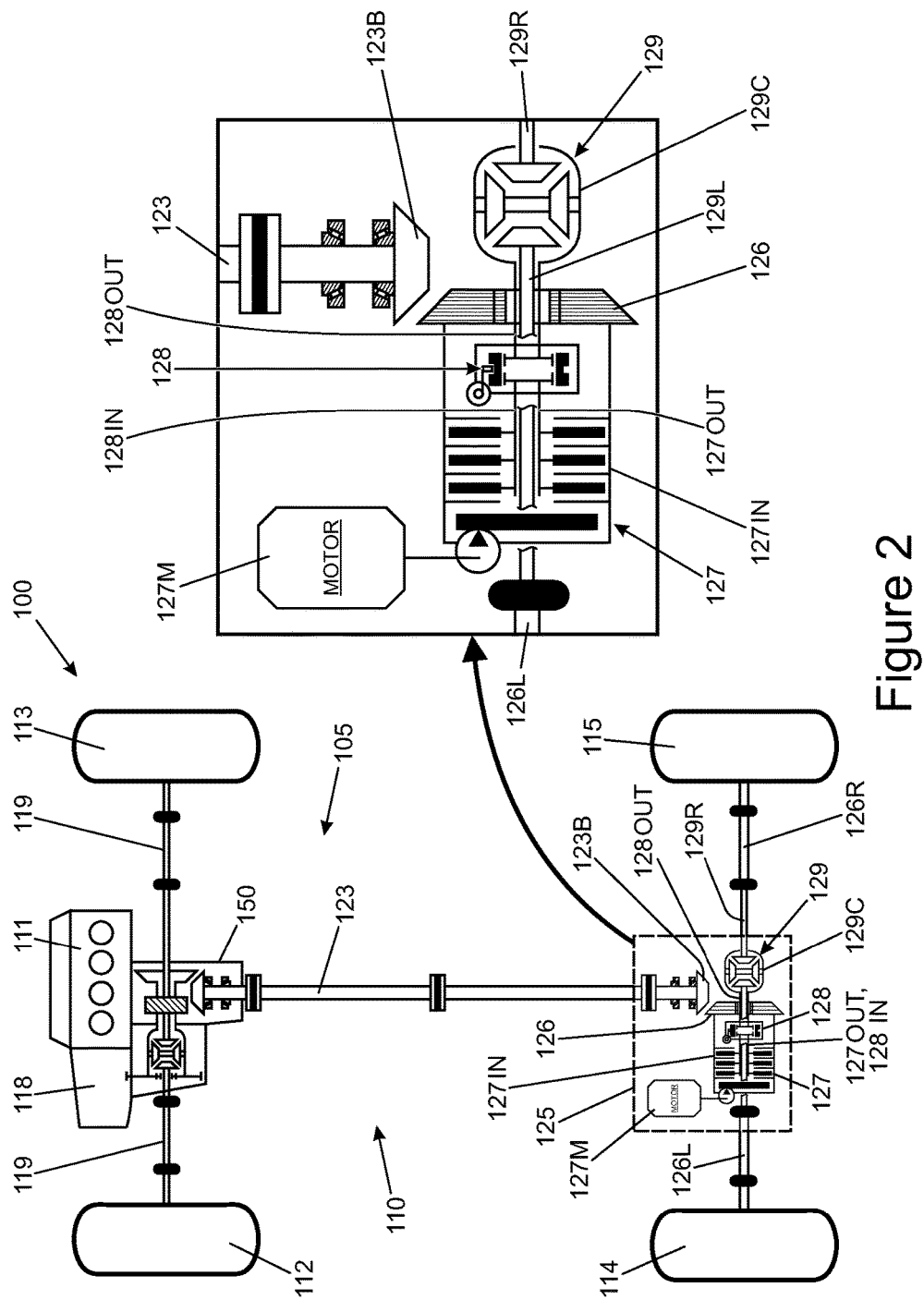
FIG. 2 is a schematic illustration of a vehicle having an RDU according to one embodiment of the invention.

FIG. 2 shows a portion of a vehicle 100 having a driveline 105 according to an embodiment of the present invention. Like features of the vehicle 100 of FIG. 2 to that of the vehicle of FIG. 1 are labelled with like reference numerals incremented by 100.

The vehicle has a rear drive unit (RDU) 125 having a multi-plate wet clutch (MPC) 127 coupled in series with a dog clutch (DC) 128. The MPC 127 has an input portion or outer plate carrier 127IN that is driven by a ring gear 126 which is in turn driven by a bevel gear 123B fixedly coupled to the auxiliary driveshaft 123 and arranged to rotate therewith.

The MPC 127 has an output portion or inner plate carrier 127OUT that is coupled to an input shaft 128IN of the DC 128—in the embodiment shown the output shaft 127OUT and input shaft 128IN are provided by the same shaft member.

The MPC 127 has an actuator in the form of a motor 127M arranged to close and open the MPC 127. Similarly the DC 128 has an actuator operable to close and open the DC 128. In some arrangements the MPC 127 and DC 128 share a common actuator. In some arrangements one or both of the MPC 127 and DC 128 may have more than one actuator.

An output shaft 128OUT of the DC 128 is coupled to a differential 129 and arranged to drive a cage 129C thereof.

Left and right output shafts 129L, 129R of the differential 129 are coupled to left and right rear drive shafts 126L, 126R of the auxiliary driveline 110 respectively.

It is to be understood that when the rear wheels 114, 115 of the vehicle 100 rotate, the output shaft 128OUT of the DC128 also rotates, regardless of whether the DC128 is open or closed, due to rotation of the differential cage 129C.

The auxiliary driveline 110 also has a power transfer unit (PTU) 150 by means of which the auxiliary driveshaft 123 may be releasably coupled to the gearbox 118 of the vehicle 100.

In use, when it is required to drive only the front wheels 112, 113 of the vehicle 100 (in the first mode of operation of the driveline) the PTU 150 is arranged to disconnect the auxiliary driveline 110 from the gearbox 118. Similarly, the RDU 125 is also controlled to open the MPC 127 and DC 128.

It is to be understood that by opening the DC 128 the rear wheels are isolated from the MPC 127 and auxiliary driveshaft 123 substantially entirely such that no drag torque or other torque due to the MPC 127 acts on the rear drive shafts 126L, 126R. This has the advantage of improving a fuel economy of the vehicle 100.

Furthermore, because the PTU 150 is opened, isolating the auxiliary driveshaft 123 from the engine 111, the auxiliary driveshaft 123 may be brought to rest thereby further reducing losses associated with the auxiliary driveline 110 when the driveline is in the first mode of operation.

It is to be understood that the bevel gear 123B and ring gear 126 are also isolated from the rear drive shafts 126L, 126R when the DC 128 is opened. Thus, in the case that the auxiliary driveshaft 123 is brought to rest when the PTU 150 is open and the DC 128 is open, losses associated with rotation of the bevel gear 123B and ring gear 126 when the front wheels and not the rear wheels are being driven may be substantially eliminated.

When it is required to drive the rear wheels 114, 115 the PTU 150 is closed to connect the auxiliary driveshaft to the gearbox 118 and subsequently the MPC 127 is closed to accelerate the input shaft of the DC 128 to the same speed of rotation as the output shaft 128OUT of the DC 128 (assuming the front wheels are not slipping). The DC 128 is then closed.

In an alternative embodiment, the MPC 127 is closed at the same time as the PTU 150 is closed or before the PTU 150 is closed, the DC 128 being closed when the PTU 150 and MPC 127 have both been closed. Other arrangements are also useful.

It is to be understood that since the DC 128 is not able to close when a difference in speed between the input and output shafts 128IN, 128OUT exceeds a prescribed value, the sequence in which the PTU 150, MPC 127 and DC 128 are closed is controlled accordingly. In some arrangements the DC 128 may be closed when the PTU 150 and/or MPC 127 are open provided that a difference in speed of rotation between the input and output shafts of the DC 128 is below a prescribed threshold.

Figure 3:
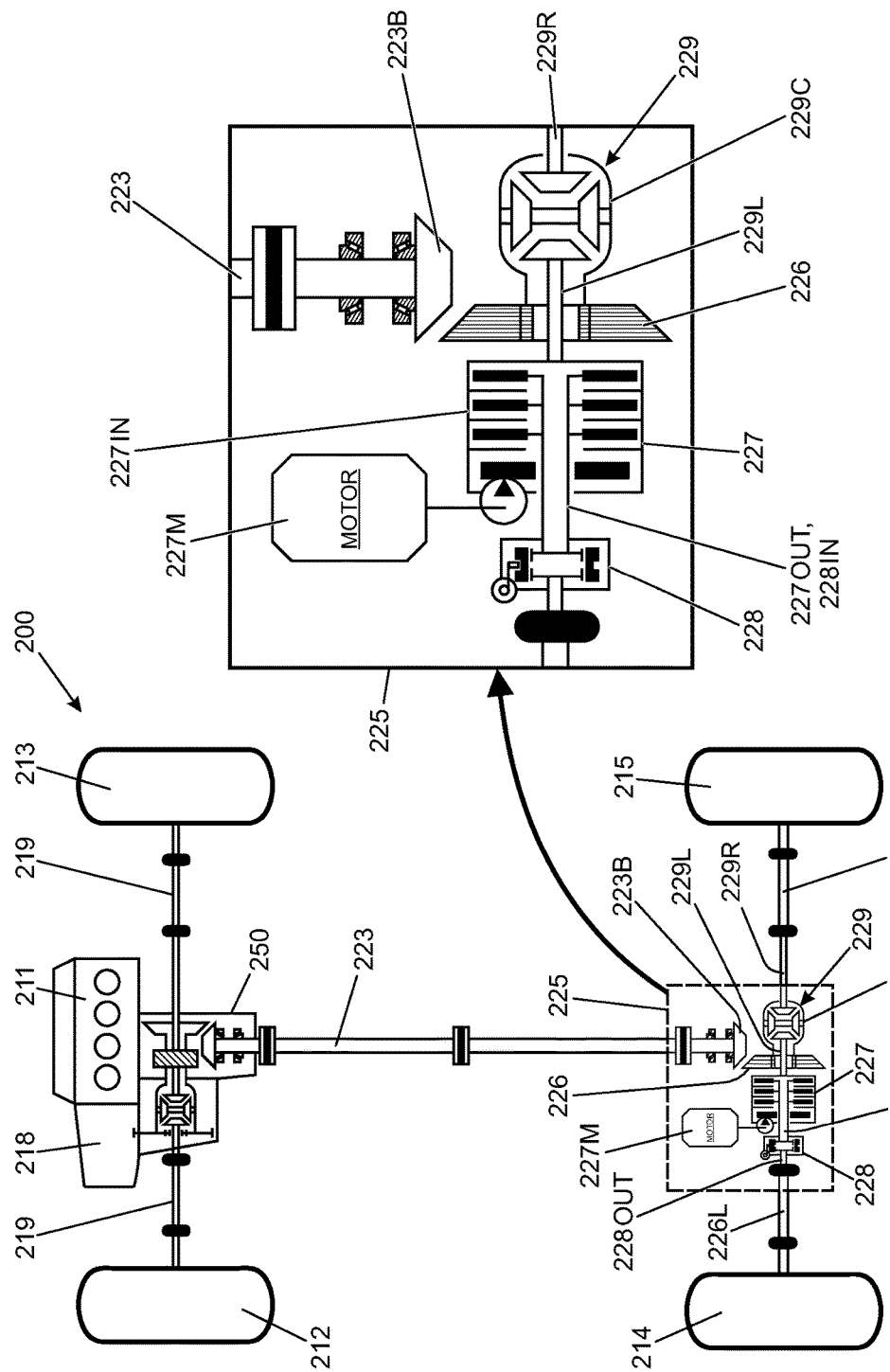
FIG. 3 is a schematic illustration of a vehicle having an RDU according to a further embodiment of the invention.

FIG. 3 shows a vehicle 200 according to a further embodiment of the invention. Like features of the vehicle 200 of FIG. 3 to that of the vehicle of FIG. 2 are labelled with like reference numerals incremented by 100.

The RDU 225 of the vehicle 200 is provided with a differential 229, an MPC 227 and a DC 228 as per the embodiment of FIG. 2. However the clutches 227, 228 are connected differently in the arrangement of FIG. 3.

In the RDU 225 the bevel gear 223B of the auxiliary driveshaft 223 is arranged to drive a cage 229C of the differential 229.

A left output shaft 229L of the differential 229 is arranged to drive an input portion 227IN of the MPC 227. A right output shaft 229R of the differential 229 is arranged to drive a right rear drive shaft 226R which in turns drives a rear right wheel 215 of the vehicle 200.

An output shaft 227OUT of the MPC 227 is arranged to drive an input shaft 228IN of the DC 228, the input shaft 228IN and output shaft 227OUT being provided by the same shaft in the embodiment of FIG. 3.

An output shaft 228OUT of the DC 228 is arranged to drive the left rear drive shaft 226L which in turn drives the rear left wheel 214.

When it is required to connect the auxiliary driveshaft 223 to the wheels 214, 215 the MPC 227 is closed and the DC 228 is closed As in the case of the embodiment of FIG. 2 it is to be understood that since the DC 228 is not able to close when a difference in speed between the input and output shafts 228IN, 228OUT exceeds a prescribed value, the sequence in which the PTU 250, MPC 227 and DC 228 are closed is controlled so as to avoid a situation in which closure of the DC 228 is effected when such a speed difference exists.

As in the case of the embodiment of FIG. 2, the bevel gear 223B and ring gear 226 are also isolated from the rear drive shafts 226L, 226R when the DC 228 is opened. Thus, losses associated with rotation of the bevel gear 223B and ring gear 226 when the front wheels and not the rear wheels are being driven may be substantially eliminated.

In the embodiment of FIG. 2 the differential 129 is coupled to the DC 128 which is in turn coupled to the MPC 127 on the same side of the differential 129 as the DC 128. The MPC 127 is itself coupled to the ring gear 126.

The MPC 127 and DC 128 may in some embodiments be provided on the opposite side of the differential 129 to that shown in FIG. 2. In some embodiments the sequence of coupling of the differential 129, DC 128 and MPC 127 to the ring gear 126 may be reversed. That is, the ring gear 126 may be coupled to the differential 129, the differential 129 coupled in turn to the DC 128, the DC 128 being coupled in turn to the MPC 127, the differential 129 and MPC 127 being arranged to drive opposite rear drive shafts to one another.

In the embodiment of FIG. 3 the differential 229 is driven by the ring gear 226, the differential 229 in turn being arranged to drive the MPC 227 which in turn drives the DC 228, the MPC 227 and DC 228 being provided on the same side of the differential 229.

It is to be understood that the MPC 227 and DC 228 may in some embodiments be provided on the opposite side of the differential 229 to that shown in FIG. 3. Furthermore, in some embodiments the sequence in which the differential 229, MPC 227, DC 228 and ring gear 226 are arranged with respect to one another may be reversed. That is, in some embodiments the ring gear 226 may be arranged to drive the DC 228 which may in turn be arranged to drive the MPC 227. The MPC 227 may in turn be arranged to drive the differential 229, left and right output shafts 229L, 229R of the differential 229 being coupled to the left and right rear drive shafts 226L, 226R respectively.

In an alternative embodiment the differential 229 is coupled between the MPC 227 and DC 228. In one arrangement the MPC 227 is coupled to the ring gear 226 and an output shaft of the MPC 227 is arranged to drive the differential cage 229C. One output shaft 229L, R of the differential 229 is arranged to drive one of the rear drive shafts 226L, R whilst the other output shaft 229R, L of the differential 229 is arranged to drive the input shaft of the DC 228. The output shaft of the DC 228 is arranged to drive the other of the rear drive shafts 226R, L.

In an alternative arrangement the DC 228 is coupled to the ring gear 226 and operable to drive the cage 229C of the differential 229. One output shaft 229L, R of the differential 229 is arranged to drive one of the rear drive shafts 226L, R whilst the other output shaft 229R, L of the differential 229 is arranged to drive the input shaft of the MPC 227. The output shaft of the MPC 227 is operable to drive the other of the rear drive shafts 226R, 226L.

Other arrangements are also useful.

Figure 4:
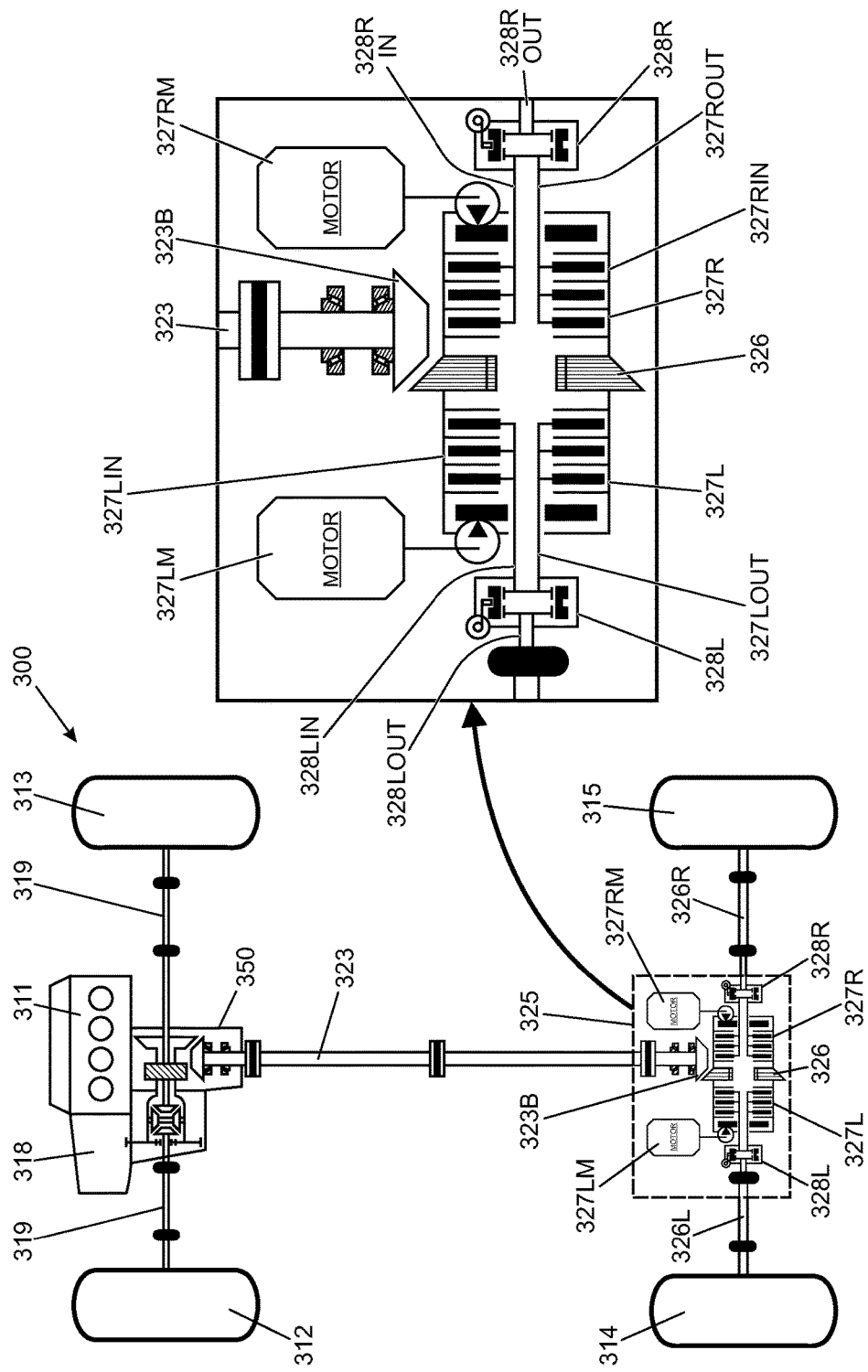
FIG. 4 is a schematic illustration of a vehicle having an RDU according to a still further embodiment of the invention.

FIG. 4 shows a vehicle 300 according to a further embodiment of the invention. Like features of the vehicle 300 of FIG. 4 to that of the vehicle 200 of FIG. 3 are labelled with like reference numerals incremented by 100.

Unlike the vehicles 100, 200 of FIG. 2 and FIG. 3 the RDU 325 of the vehicle 300 of FIG. 4 does not have a differential 129, 229. Rather, the RDU 325 is arranged to drive respective left and right rear drive shafts 326L, 326R by means of respective multi-plate wet friction clutches (MPCs) 327L, 327R each coupled in series with a respective dog clutch 328L, 328R. The MPCs 327L, 327R are arranged to accommodate different respective rates of rotation of the rear wheels 314, 315 by slippage of the clutches 327L, 327R when the rear wheels 314, 315 are being driven by the auxiliary driveshaft 323. This feature eliminates the requirement for a differential 129, 229.

The auxiliary driveshaft 323 has a bevel gear 323B fixed to an end thereof and arranged to drive a ring gear 326 of the RDU 325 which is in turn arranged to drive input portions 327LIN, 327RIN of each of the MPCs 327L, 327R respectively.

Output shafts 327LOUT, 327ROUT of the respective MPCs 327L, 327R are arranged to drive input shafts 328LIN, 328RIN of respective dog clutches 328L, 328R. In the arrangement of FIG. 4 the output shafts 327LOUT, 327ROUT and the input shafts 327LIN, 327RIN are provided by the same shaft although other arrangements are also useful.

Output shafts 328LOUT, 328ROUT of the respective dog clutches 328L, 328R are arranged to drive left and right drive shafts 326L, 326R respectively.

It is to be understood that closure of the PTU 350, MPCs 327L, 327R and DCs 328L, 328R allows torque to be provided to the rear wheels 314, 315 of the vehicle 300 from the gearbox 318.

As in the case of the embodiment of FIG. 2 it is to be understood that since the DCs 328L, 328R are not able to close when a difference in speed between their respective input and output shafts exceeds a prescribed value, the sequence in which the PTU 350, MPCs 327L, 327R and DCs 328L, 328R are closed is controlled accordingly.

Thus, it is to be understood that when the vehicle 300 is moving the PTU 350 and MPCs 327L, 327R may be controlled so as to accelerate the auxiliary drive shaft 323 and input shafts of the DCs 328L, 328R to match a speed or rotation of respective output shafts of the DCs 328L, 328R before the DCs 328L, 328R are closed.

Embodiments of the present invention employing dog clutches or like releasable torque transmitting means having an open condition in which substantially no torque (including residual drag torque) is transmitted therethrough have the advantage that reduced losses are experienced when the driveline is in the first mode of operation (corresponding to a two wheel drive mode in the illustrated embodiments although in some embodiments other numbers of driven wheels are also useful in the first mode). By opening the PTU 350 and DCs 328L, 328R the auxiliary driveshaft 323 and MPCs 327L, 327R may be brought to rest thereby substantially eliminating parasitic losses associated with their rotation. This enables an amount of energy required in order to travel a given distance in the first mode of operation of the driveline to be reduced.

Figure 6:
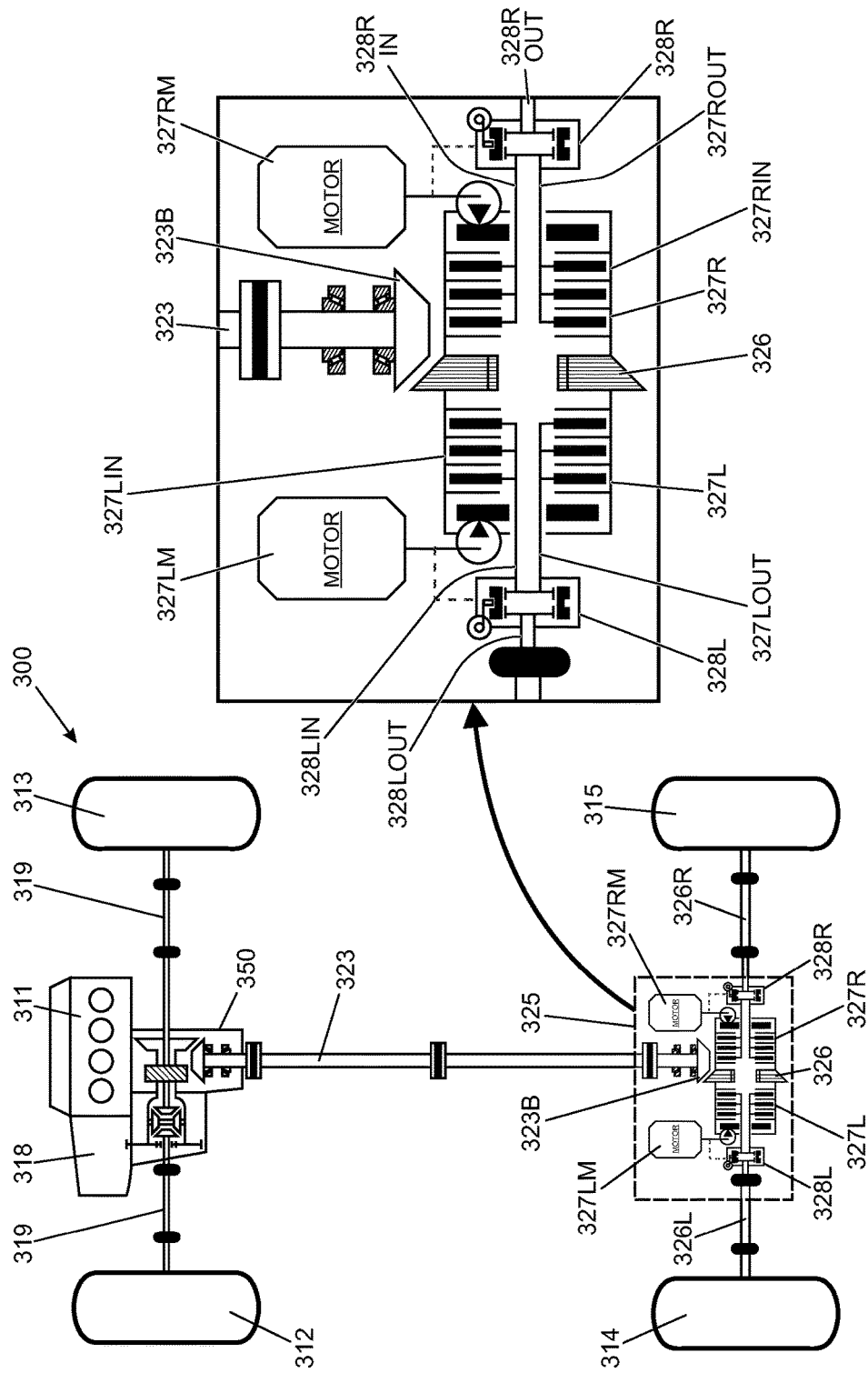
FIG. 6 is a schematic illustration of a vehicle having an RDU according to still another embodiment of the invention.

In an embodiment, the DC 328L and the MPC 327L are independently operable by means of separate actuators. However, in other embodiments such as, for example, that illustrated in FIG. 6, the DC 328L and MPC 327L are arranged to be actuated by means of a common actuator (e.g., the motor 327LM). Similarly, in an embodiment, the DC 328R and the MPC 327R are independently operable by means of separate actuators. However, in other embodiments, such as, for example, that illustrated in FIG. 6, the DC 328R and MPC 327R are arranged to be actuated by means of a common actuator (e.g., the motor 327RM).

Losses are reduced substantially because the one or more dog clutches may be employed substantially to isolate the rear wheels from the one or more other releasable torque transmitting means of the RDU (such as wet friction clutches having losses associated therewith) even when in the open condition. By isolating the rear wheels from the wet clutches of the RDU less drag torque is applied to the wheels when in the first mode of operation thereby enhancing fuel economy.

Furthermore, it is to be understood that because the auxiliary driveshaft 323 is brought to rest when the PTU 350 and RDU 325 are open, the ring gear 326 and bevel gear 323B are also brought to rest and therefore losses associated with rotation of these components are also eliminated.

Other arrangements are also useful.

Figure 5:
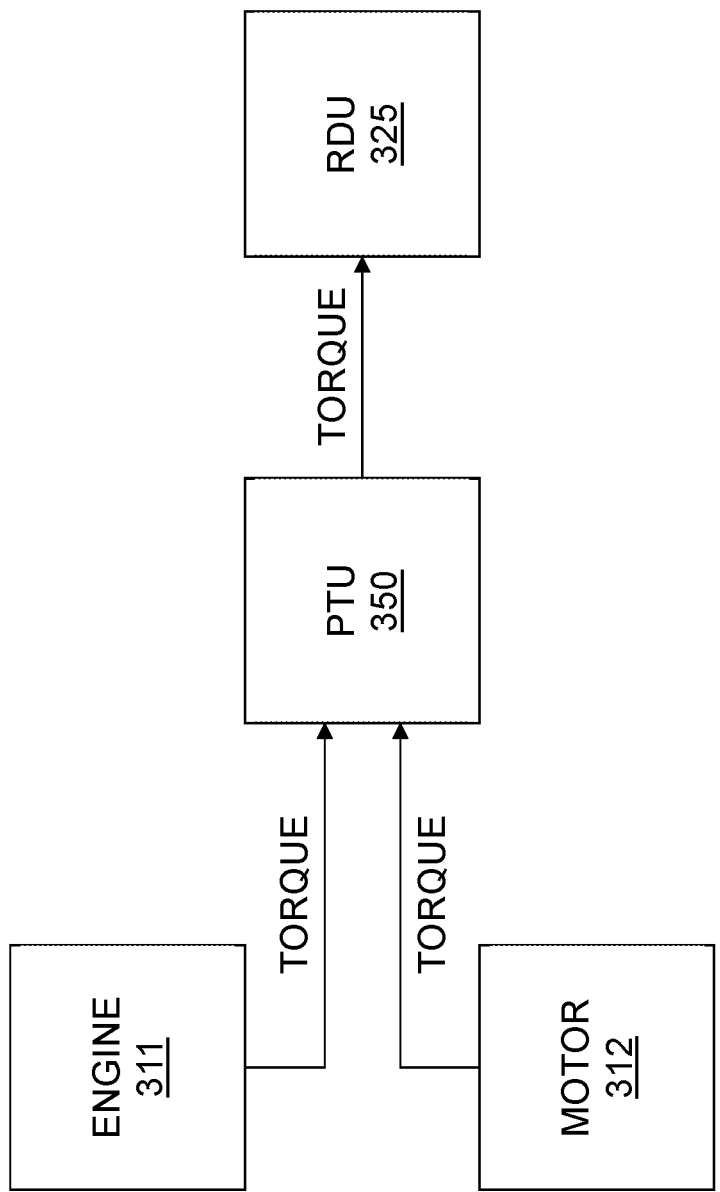
FIG. 5 is a schematic illustration of a vehicle having an RDU according to a yet still further embodiment of the invention.

In some arrangements, such as, for example, that shown in FIG. 5, the engine 311 is a first prime mover and the vehicle includes a second prime mover comprising one or more electric machines 312. The one or more electric machines 312 may be provided to provide drive torque to the driveline in addition to the engine 311. In some arrangements the engine 311 and at least one electric machine 312 may be operated in parallel to drive the driveline in both the first and second modes of operation of the driveline.

In some embodiments the engine may be arranged to drive the front wheels only. The at least one electric machine may be arranged to drive the auxiliary driveline by means of the PTU when the driveline is in the second mode of operation.

It is to be understood that in the embodiments of FIG. 2 to FIG. 4 the PTU is provided in a front portion of the motor vehicle and the RDU is provided in a rearward portion. In some embodiments the locations may be reversed. Thus in some embodiments the PTU and RDU may be arranged releasably to connect the front wheels of the vehicle to the engine.

In some embodiments the engine may be provided at a forward or rearward location of the vehicle in a transverse (or 'east-west'), longitudinal (or 'north-south') or any other suitable orientation, or at any suitable location between forward and rearward locations of the vehicle.

The RDU may be provided in a forward portion or other suitable location of the vehicle.

The PTU may be provided in a rearward portion of a vehicle having a rearward mounted engine. The PTU may be arranged to connect or disconnect the auxiliary driveshaft from the engine, the driveshaft being arranged to drive front wheels of the vehicle via the RDU. As noted above the RDU may be provided at a forward location of the vehicle and arranged releasably to connect the front wheels to the auxiliary driveshaft. In such embodiments the RDU may alternatively be referred to as a 'front drive unit' or FDU.

Other arrangements are also useful.

In some arrangements actuators of the PTU and RDU may be actuated by one or more electromechanical actuators. Alternatively or in addition one or more hydraulic actuators may be employed.

In the embodiments illustrated in the figures the engine is oriented in a transverse or 'east-west' orientation. As noted above in some alternative embodiments the engine may be oriented in a longitudinal or 'north-south' orientation.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A vehicle comprising:
   prime mover means;
   at least first and second groups of wheels; and
   a driveline to connect the prime mover means to the first and second groups of wheels such that the first group of wheels may be driven by the prime mover means when the driveline is in a first mode of operation and the second group of wheels may additionally be driven by the prime mover means via an auxiliary driveshaft comprised in the driveline when the driveline is in a second mode of operation; and
   a controller for controlling the driveline to transition between the first and second modes of operation, wherein the controller is configured to operate a drive means comprised in the driveline to connect and disconnect side shafts arranged to provide torque to respective different wheels of the second group of wheels to and from the auxiliary driveshaft when the driveline transitions between the first mode and the second mode,
   the drive means comprising a ring gear, a pair of multi-plate wet clutches, and a pair of interference-type clutches, wherein the ring gear is arranged to be driven by the auxiliary driveshaft and to drive respective inputs of the pair of multi-plate wet clutches which are arranged to facilitate differential rates of rotation between the side shafts by means of slip across the respective multi-plate wet clutches,
   the respective outputs of the pair of multi-plate wet clutches being arranged to drive respective inputs of the pair of interference-type clutches, each interference-type clutch operable between a first condition in which its input is substantially isolated from its output and a second condition in which its input and output are directly coupled such that torque applied to the input is transmitted substantially directly to the output, the respective outputs of the pair of interference-type clutches being arranged to drive the respective side shafts,
   wherein operating the drive means to connect the side shafts to the auxiliary driveshaft comprises:
      causing respective actuators to operate each of the pair of multi-plate wet clutches to accelerate the respective inputs of the pair of interference-type clutches towards a speed of rotation of the respective outputs of the pair of interference-type clutches rotating with the respective side shafts, and
      subsequently causing each of the pair of interference-type clutches to transition from the first condition to the second condition to thereby facilitate driving of the side shafts by the prime mover means.

2. The vehicle as claimed in claim 1 wherein the pair of interference-type clutches comprise first and second dog clutch devices respectively.

3. The vehicle as claimed in claim 1 wherein the pair of interference-type clutches comprise first and second roller clutch devices respectively.

4. The vehicle as claimed in claim 1 wherein the drive means is operable to bring the ring gear to rest when the driveline is in the first mode of operation.

5. The vehicle as claimed in claim 1 wherein the driveline further comprises a power transfer unit (PTU) operable releasably to connect the prime mover means to the auxiliary drive shaft, the driveline being operable when in the first mode to allow the auxiliary drive shaft to come to rest when the prime mover means is driving the first group of wheels.

6. The vehicle as claimed in claim 5 wherein the prime mover means comprises first and second prime movers.

7. The vehicle as claimed in claim 6 wherein the first prime mover is operable to drive the first group of wheels and the second group of wheels.

8. The vehicle as claimed in claim 6 wherein at least one of the first and second prime movers comprises an electric machine.

9. The vehicle as claimed in claim 8 wherein the electric machine is configured to drive the driveline in both the first and second modes of operation.

10. The vehicle as claimed in claim 1 wherein respective multi-plate wet clutches and the interference-type clutches are independently operable by means of separate respective actuators.

11. The vehicle as claimed in claim 1 wherein one of the respective multi-plate wet clutches and one of the interference-type clutches are arranged to be actuated by means of a common one of the actuators.

12. A method of releasably coupling a second group of wheels of a motor vehicle to prime mover means by means of a driveline such that a first group of wheels and the second group of wheels may be driven by the prime mover means, the method comprising the steps of:

coupling an auxiliary driveshaft comprised in the driveline to side shafts arranged to provide torque to respective different wheels of the second group of wheels by drive means comprised in the driveline and having a ring gear, a pair of multi-plate wet clutches comprising respective inputs and outputs, and a pair of interference-type clutches comprising respective inputs and outputs, the ring gear being arranged to be driven by the auxiliary driveshaft and to drive the respective inputs of the pair of multi-plate wet clutches, the respective outputs of the pair of interference-type clutches being arranged to provide torque to respective side shafts of the vehicle;

causing respective actuators to operate each of the pair of multi-plate wet clutches to provide slip between the respective inputs and respective outputs of each of the pair of multi-plate wet clutches to thereby facilitate differential rates of rotation between the side shafts and to cause each of the pair of multi-plate wet clutches to accelerate the respective inputs of the pair of interference-type clutches towards a speed of rotation of the respective outputs of the pair of interference-type clutches rotating with the respective side shafts; and subsequently causing each of the pair of interference-type clutches to transition from a first condition in which its input is isolated from its output to a second condition in which its input and output are directly coupled such that torque applied to its input is transmitted directly to its output to thereby facilitate driving of the side shafts by the prime mover means.

13. A controller for controlling a driveline of a vehicle to transition between first and second modes of operation, wherein a first group of wheels is driven by a prime mover means when the driveline is in the first mode of operation and a second group of wheels is additionally driven by the prime mover means via an auxiliary driveshaft comprised in the driveline when the driveline is in the second mode of operation, the controller being configured to operate a drive means comprised in the driveline to connect and disconnect side shafts arranged to provide torque to respective different wheels of the second group of wheels to and from the auxiliary driveshaft when the driveline transitions between the first mode and the second mode, the drive means comprising a ring gear, a pair of multi-plate wet clutches, and a pair of interference-type clutches, wherein the ring gear is arranged to be driven by the auxiliary driveshaft and to drive respective inputs of the pair of multi-plate wet clutches which are arranged to facilitate differential rates of rotation between the side shafts by means of slip across the respective multi-plate wet clutches, respective outputs of the pair of multi-plate wet clutches being arranged to drive respective inputs of the pair of interference-type clutches, each interference-type clutch operable between a first condition in which its input is isolated from its output and a second condition in which its input and output are directly coupled such that torque applied to its input is transmitted directly to its output, the respective outputs of the pair of interference-type clutches being arranged to drive respective side shafts, wherein operating the drive means to connect the side shafts to the auxiliary driveshaft comprises:

causing respective actuators to operate each of the pair of multi-plate wet clutches to accelerate respective inputs of the pair of interference-type clutches towards a speed of rotation of the respective outputs of the pair of interference-type clutches rotating with the respective side shafts, and subsequently causing each of the pair of interference-type clutches to transition from the first condition to the second condition to thereby facilitate driving of the side shafts by the prime mover means.

14. The controller as claimed in claim 13 configured to operate the drive means to bring the ring gear to rest when the driveline is in the first mode of operation.

* * * * *